United States Patent [19]
Smock et al.

[11] Patent Number: 5,810,331
[45] Date of Patent: Sep. 22, 1998

[54] PLASTIC INLET APPLIANCE WATER VALVE

[75] Inventors: Steven William Smock, Marion County; Neil Edward Grah, Hendricks County; Michael Roy DuHack, Marion County, all of Ind.

[73] Assignee: Emerson Electric Co., St. Louis, Mo.

[21] Appl. No.: 395,274

[22] Filed: Feb. 27, 1995

Related U.S. Application Data

[63] Continuation-in-part of Ser. No. 55,126, Apr. 29, 1993, abandoned.

[51] Int. Cl.⁶ ..................................... F16L 19/08
[52] U.S. Cl. ..................... 251/148; 285/340; 285/382.7
[58] Field of Search .............................. 251/148, 129.15; 285/382.7, 340, 342

[56] References Cited

U.S. PATENT DOCUMENTS

| | | | |
|---|---|---|---|
| 3,501,177 | 3/1970 | Jacobs | 285/322 |
| 3,888,521 | 6/1975 | O'Sickey | 285/342 X |
| 4,298,222 | 11/1981 | Davies | 285/341 |
| 4,558,844 | 12/1985 | Donahue, Jr. | 251/118 |
| 4,697,608 | 10/1987 | Kolze et al. | 251/129.15 X |
| 4,889,316 | 12/1989 | Donahue, Jr. | 251/129.15 |
| 5,082,240 | 1/1992 | Richmond | 251/30.03 X |

OTHER PUBLICATIONS

JACO Product Brochure, *Vibra–Pruf Tube Fittings* (Jan. 1, 1986).

*Primary Examiner*—Kevin Lee
*Attorney, Agent, or Firm*—Mark D. Becker

[57] ABSTRACT

An apparatus and method for connecting a residential water line to a household appliance, solenoid controlled, inlet water valve such as that used on a refrigerator freezer icemaker is disclosed. A residential water line, typically a 0.25 inch (0.635 cm) diameter copper or plastic line, is connected to an all plastic inlet connector. The inlet connector has an integral ferrule seat. A ferrule nut designed to cooperate with the ferrule seat is slipped over the water line. The water line is positioned against a shoulder in the inlet connector that properly positions the water line. The ferrule nut is tightened to seal and fix the water line in the inlet connector

20 Claims, 13 Drawing Sheets

PRIOR ART

PRIOR ART

PLASTIC INLET APPLIANCE WATER VALVE

This is a continuation-in-part of application Ser. No. 08/055,126, filed Apr. 29,1993, now abandoned.

BACKGROUND

This invention relates to water valves and more specifically to solenoid operated inlet water valves used on household appliances.

Inlet water valves have been used on household appliances such as ice makers, dishwashers, and clothes washers for many years to control the flow of water into the appliance. Inlet water valves are typically attached to the appliance with an inlet connector attached with a union connector to a water source pipe, and the inlet water valve outlet is connected to the appliance. A solenoid operated by the appliance actuates a valve to permit or stop water flow into the appliance. The solenoid can either directly actuate the valve or can operate a pilot valve to actuate the valve.

The manufacturing of inlet water valves has become increasingly competitive and the most desirable inlet water valve designs have the fewest parts and the fewest manufacturing steps. The use of fewer parts and fewer manufacturing steps generally results in decreased cost and increased quality. Also, new regulations such as California Proposition 65 which may require removal of all lead, even the small amount almost all brass contains for machining purposes, from all home appliances that contact potable water in the near future. Another concern of appliance manufacturers is to have an inlet valve that is easy to connect to a water source pipe preferably without the use of tools.

Some prior art water valves 20P, such as shown in FIGS. 1, 2, and 3, have inlet connectors 22P, that are brass. A brass plate 24P is attached to the water valve inlet 26P and a brass elbow 28P is screwed into the brass plate 24P to provide an inlet connector 22P. Brass inlet connectors are expensive to manufacture. Additionally, lead contained in the brass inlet connector can leach into water used by the appliance, Some prior art inlet connectors have a connector insert that is fixed in the inlet connector and the water source pipe is attached to the connector insert. Connector inserts are often made of brass because of its anti-corrosion properties and strength. Also some prior art valves use a brass insert in a plastic inlet connector and a brass compression fitting to attach the water source pipe. An example of a plastic inlet connector with a brass insert and compression fitting is disclosed in U.S. Pat. No. 4,697,608 issued to Kolze et al.

Some prior art valves have used quick connect/disconnect type connectors on the inlet connector. Quick connect/disconnect type connectors typically include several parts such a O-ring seals, grip rings, spacers, and a threaded nut. The O-rings is a quick connect/disconnect connector are vulnerable to damage when the water source line is inserted into the connector. If the water source line has a bur or sharp edge the O-ring can be damaged causing a leak. Additionally, over time O-rings can loose their elasticity and can cause leaks. An example of the use of a quick connect/disconnect connector on an ice maker is disclosed in U.S. Pat. No. 4,889,316 issued to Donahue, Jr.

Some prior art water valves, such as shown in FIG. 4, inlet connectors do not have a connector insert but are configured instead configured to accept a garden hose style connector. Although this reduces components compared to inlet connectors 32P with connector inserts, garden hose connectors have a tendency to leak because a portion of the connector is typically soldered. During the life of the appliance, vibration can cause this solder joint to crack and leak water. Additionally, solder typically contains lead which will be discouraged or prohibited in consumer appliances dispensing drinking water under laws such as California Proposition 65, The Safe Drinking Water and Toxic Enforcement Act of 1986.

For the foregoing reasons, there is a need for an inlet water valve connector that does not contain brass, contains fewer parts, eliminates the need for union connector, is more reliable, is less expensive to produce, reduces the number of rejected parts for failure to meet quality standards, less likely to leak compared with a garden hose style connector, and can be configured with an exit angle that reduces the need for the water source pipe to make tight bends.

SUMMARY

We have invented an apparatus and method that satisfies the need for an appliance water valve with an all plastic integral inlet connector angled from about 30–90 degrees to the inlet. The plastic inlet appliance water valve comprises the following. A water source pipe which supplies water to the appliance. A valve body having an inlet that controls the input of water from the water source pipe to the appliance. A frame for attaching the valve body to the appliance and the frame is shaped to protect the plastic inlet connector from damage. A ferrule nut used to attach the water source pipe to the water valve. A plastic inlet connector having a ferrule seat attached to the inlet for receiving the water source pipe and a shoulder that is integral to the plastic inlet connector for properly positioning the water source pipe.

The method for attaching a water source pipe to an appliance water valves, comprises the following steps. A water source pipe is provided to the appliance water plastic inlet appliance water valve. A plastic inlet connector is provided that is attached to the water valve body having a water source orifice for receiving the water source pipe, a threaded connector surrounding the water source orifice and a ferrule seat around the upstream periphery of the water source orifice. A ferrule nut is also provided having a ferrule seal, a gripper, and threads that cooperate with the threaded receptacle for attaching the ferrule nut to the plastic inlet connector and a nut bore sized to accept the water source pipe.

The ferrule nut threads are engaged on the threaded connector surrounding the water source orifice. The water source pipe is inserted through the ferrule nut bore and into the water source orifice until the water source pipe rests on a shoulder on the downstream end of the water source orifice. The ferrule nut is then tightened causing the ferrule seal to engage the ferrule seat of the plastic inlet connector; A seal is formed between the inlet orifice and the water source pipe by the ferrule seal engaging the ferrule seat and pressing against the water source pipe. Finally, the water source pipe is gripped by the ferrule nut gripper that is angled to wedge the water source pipe in the inlet orifice.

The following are objects of the invention. Meet anticipated regulatory requirements to eliminate parts containing lead, e.g. brass, in household appliances using potable water by providing an all plastic inlet that eliminates the need for brass fittings which can contain lead. Decrease the manufacturing costs and increase quality by reducing the number of manufactured parts required to produce an appliance inlet water valve. Eliminate the need to use a union connector to attach the water source pipe to the inlet connector. Create an easier to install appliance inlet water valve that does not require tools to attach the water source pipe to the inlet connector. Eliminate leaks caused by garden hose connector broken solder joints on appliance inlet water valves by eliminating garden hose connectors. Decrease water source pipe kinks and obstructions by having the inlet connector make a 30–90 degree bend rather than the water source pipe. Decrease water inlet flow noise caused by cavitation. Eliminate leakage that can occur around a brass insert or brass insert gasket in the inlet connector by eliminating the need for a brass insert.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
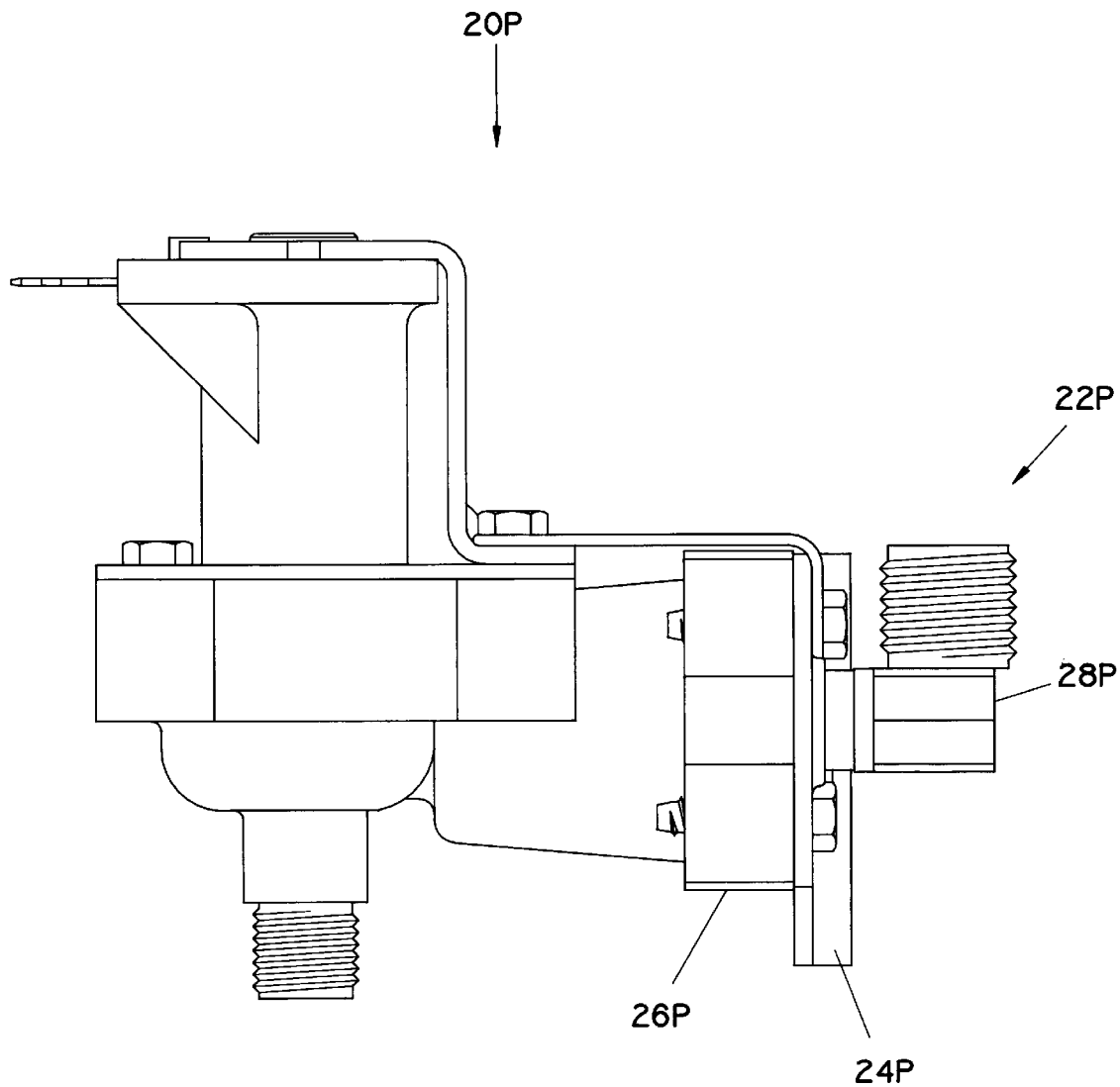
FIG. 1 shows a prior art inlet water valve with a brass inlet connector.
Figure 2:
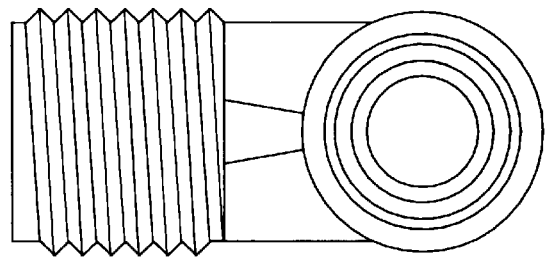
FIG. 2 shows a prior art brass inlet elbow.
Figure 3:
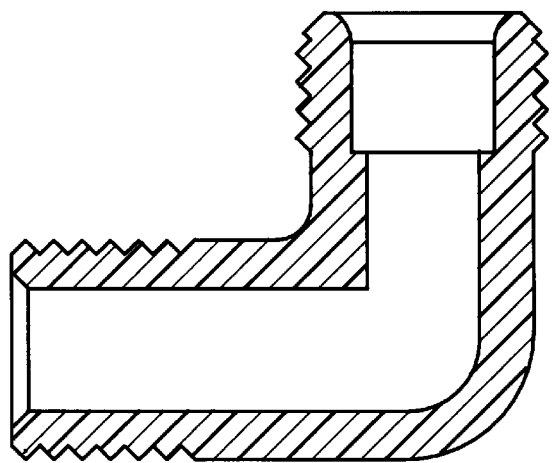
FIG. 3 shows another view of the prior art brass inlet elbow.
Figure 4:
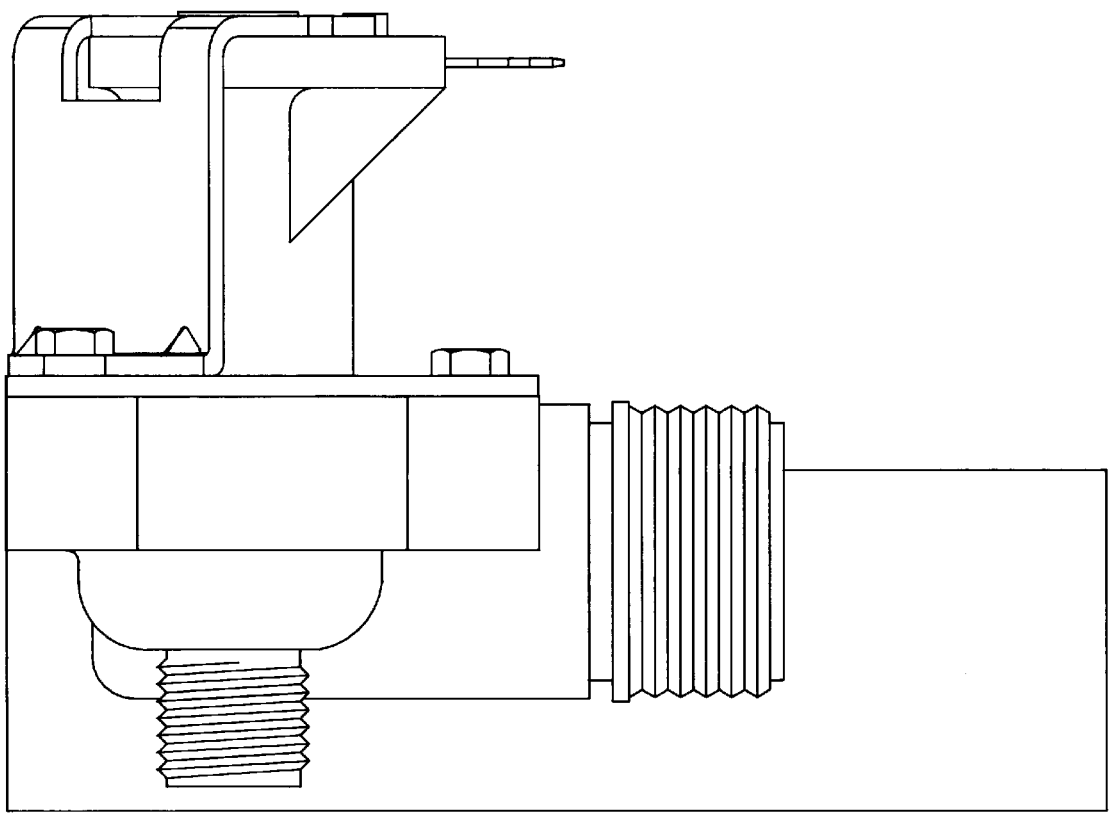
FIG. 4 shows a prior art inlet water valve with a garden hose inlet connector.
Figure 5:
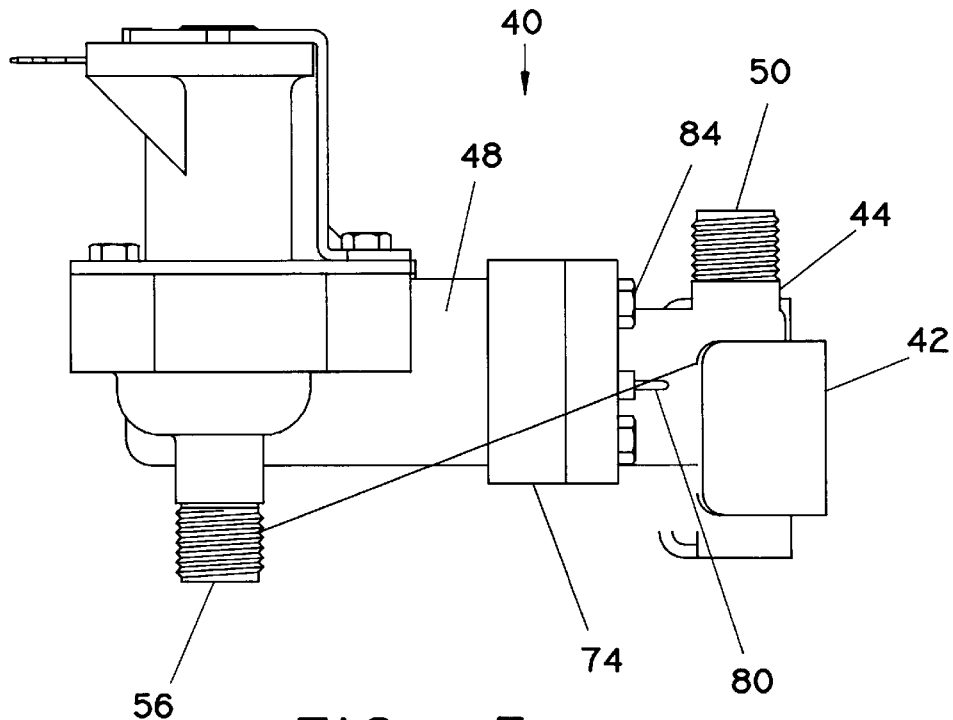
FIG. 5 shows an inlet water valve with a plastic inlet connector.
Figure 6:
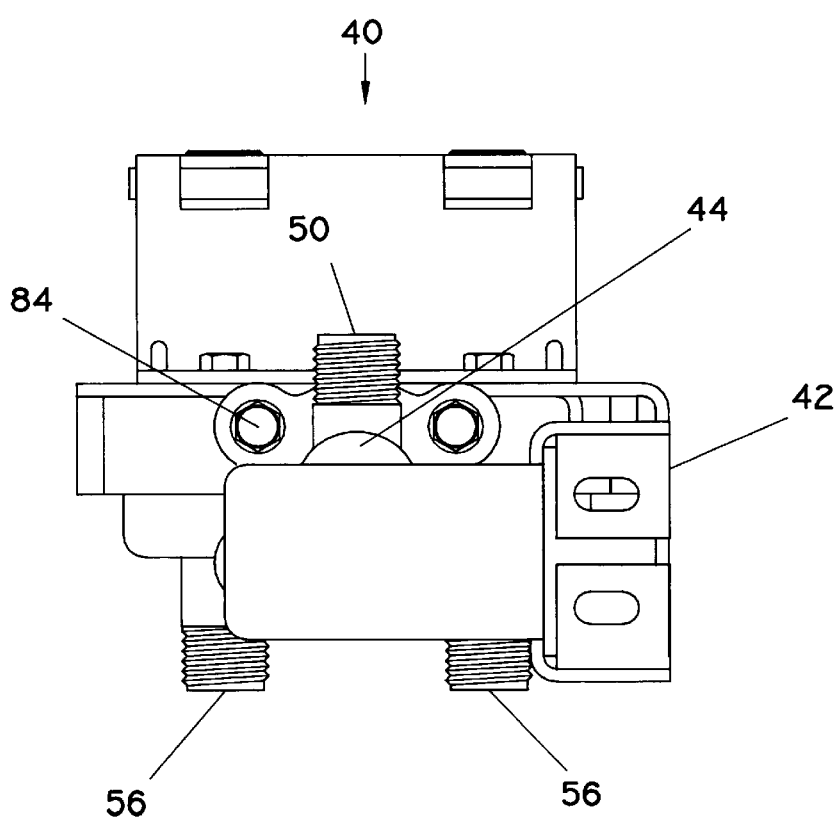
FIG. 6 shows another view of the inlet water valve with the plastic inlet connector.
Figure 7:
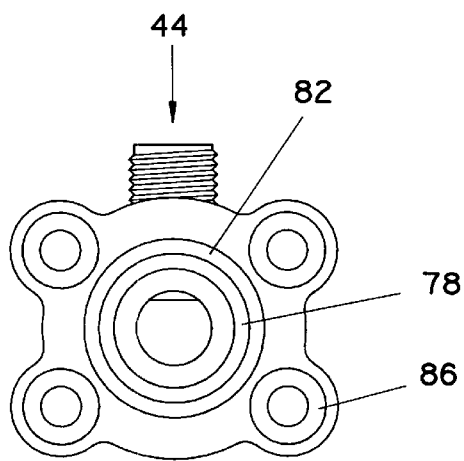
FIG. 7 shows a view of the plastic inlet connector surface that attaches to the water valve inlet.
Figure 8:
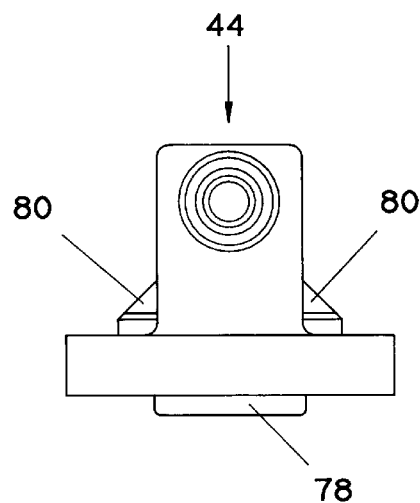
FIG. 8 shows a view of the plastic inlet connector water source orifice.
Figure 9:
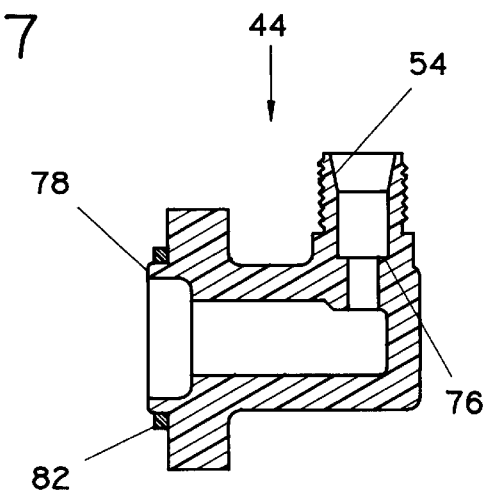
FIG. 9 shows a sectioned view of the plastic inlet connector.
Figure 10:
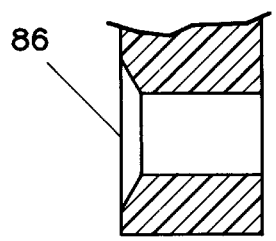
FIG. 10 shows a sectioned view of the plastic inlet connector attachment bore.
Figure 11:
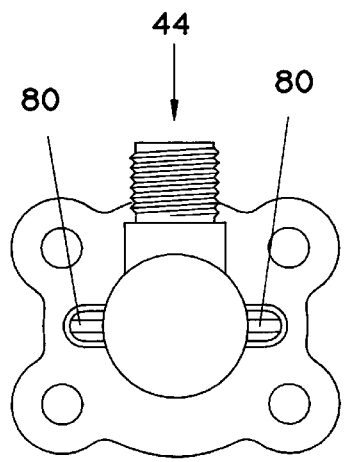
FIG. 11 shows an exterior view of the plastic inlet connector.

Referring to FIGS. 5 and 6, an appliance inlet water valve 40 of the type typically found in a refrigerator freezer ice maker is shown. The water valve 40 is typically attached to the back or bottom of the refrigerator with a metal frame 42 and a water source pipe 46 (FIG. 12) is run from a residential water line to the water valve inlet connector 44.

An appliance water valve 40, having features of the invention, comprises: a water source pipe 46 for supplying water to the appliance; a valve body 48 having an inlet 74 controlling the input of water from the water source pipe 46 to the appliance; a ferrule nut 52 (FIG. 12) for attaching the water source pipe 46 to the water valve 40; and, a plastic inlet connector 44 having an integral ferrule seat 54 attached to the inlet connector 44 for receiving the water source pipe 46 and ferrule nut 52.

The water source pipe 46 found in a residential house can take a variety of forms such as a plastic or copper pipe with a diameter of typically 0.25 inches (0.635 cm). Water source pipes 46 are often located in areas that are not out in the open such as under sinks, in kitchen corners, and behind refrigerators which may be dark and cramped. In such spaces maneuvering tools can be difficult.

The valve body 48 having an inlet connector 44 is molded preferably from a plastic such as a Food and Drug Agency (FDA) grade polypropylene. The valve body 48 in addition to the inlet connector 44 has a valving calving cavity, a guide tube, an armature, field windings, a diaphragm, a diaphragm insert (not shown), and an outlet 56. A metal frame 42 is attached to the valve body 48 for mounting the water valve 40 to the appliance, supplying an electrical ground connection, and for protecting the inlet connector 44 from damage. The plastic inlet connector 44 often extends beyond the back of an appliance such as on a refrigerator to facilitate connection of the water source line 46 to the plastic inlet connector 44 by the customer or installer. Since the plastic inlet connector 44 may not be protected by the appliance cabinet (not shown), the plastic inlet connector 44 can be damaged when moving an appliance or during appliance installation. The water valve metal frame 42 is typically constructed of a 14 gauge 1008/1010 cold rolled steel and shrouds the plastic inlet connector 44 on three sides to protect the plastic inlet connector 44 from damage.

Figure 18:
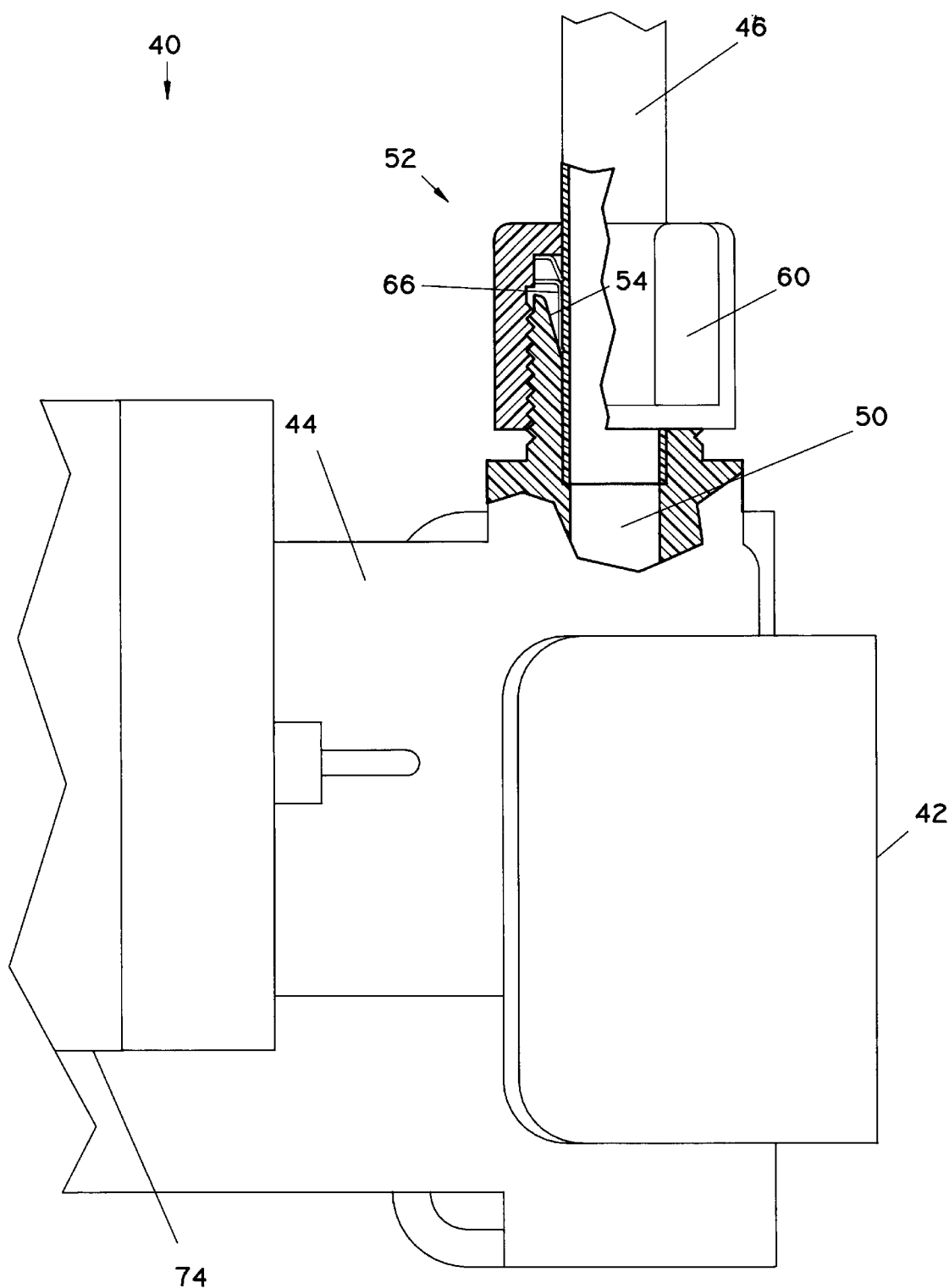
FIG. 18 shows an inlet connector with an installed water source pipe and a metal frame.
Figure 19:
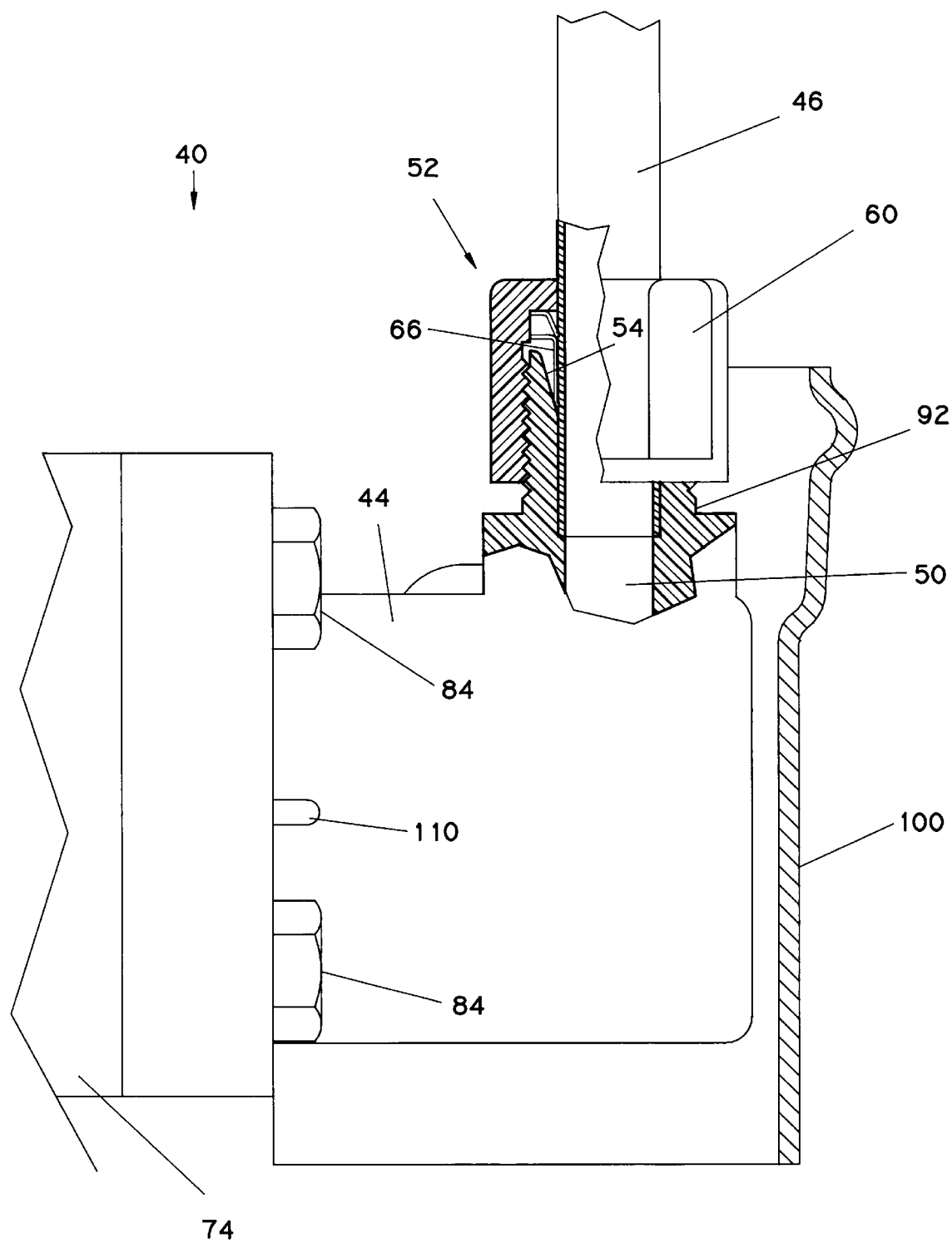
FIG. 19 shows an inlet connector with an installed water source pipe and a contoured metal frame.
Figure 20A:
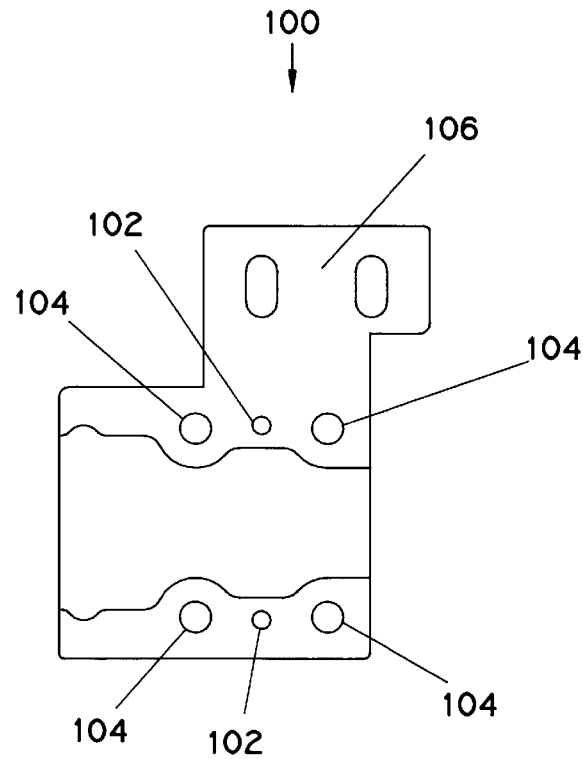
FIGS. 20A–C show a contoured metal frame.
Figure 20B:
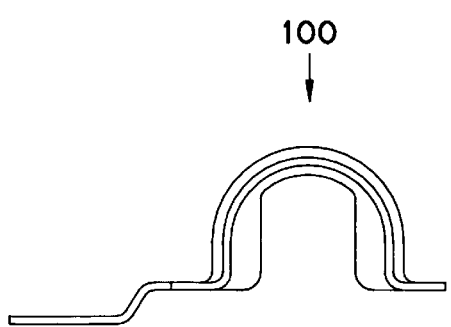
Figure 20C:
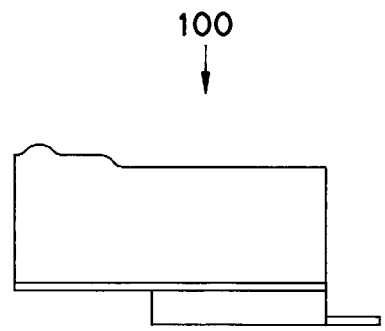
Figure 21:
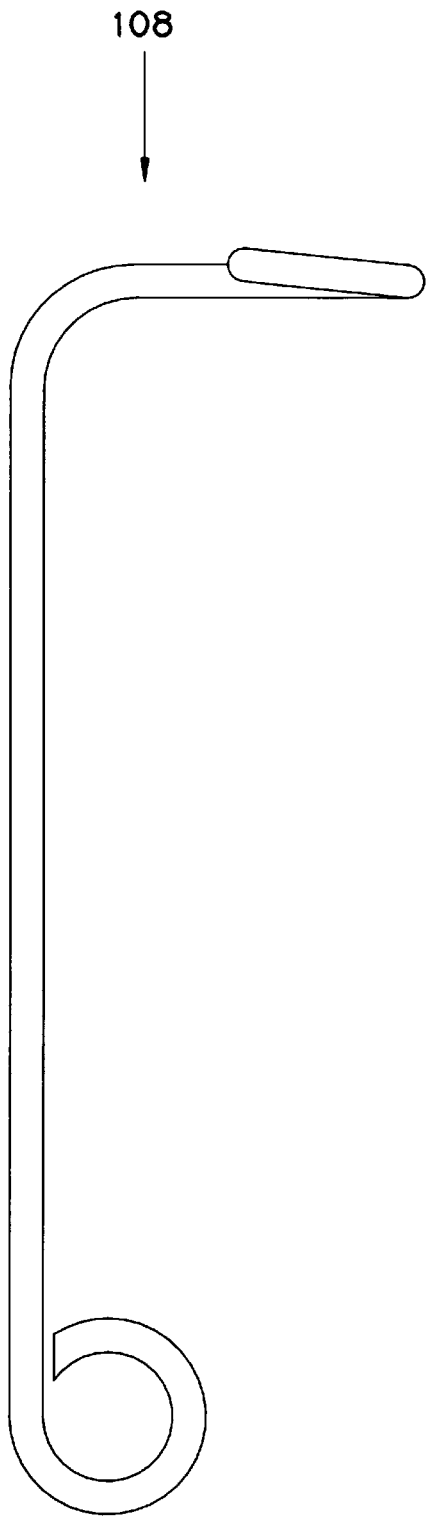
FIG. 21 shows a ground wire.

Referring to FIGS. 19–21, additional protection for the plastic inlet connector 44 can be provided with a contoured metal frame 100. The contoured metal frame 100 comprises alignment holes 102, screw holes 104, a mount 106, and a ground wire 108. The contoured metal frame 100 is aligned on the plastic inlet connector 44 with alignment holes 102 that engage alignment bosses 110 on the plastic inlet connector 44. The ground wire 108 electrically connects the armature ground to the mount 106 which is then electrically connected an appliance (not shown). Once the contoured metal frame 100 is aligned, the contoured metal frame 100 is attached to the plastic inlet connector 44 with four screws 84. The four screws 84 also attached the plastic inlet connector 44 to the inlet 74. The contoured metal frame 100 is manufactured from a material similar to that used for the metal frame 42 (FIG. 18).

The contoured metal frame 100 protects the plastic inlet connector 44 from lateral force of at least one hundred pounds (45.36 Kg) that can be inadvertently applied when the water source pipe 46 is installed on the plastic inlet connector 44. When a lateral force is applied to the plastic inlet connector 44, the plastic inlet connector 44 flexes and then the contacts the contoured metal frame 100. Since the contoured metal frame 100 is much more rigid than the plastic inlet connector 44, the contoured metal frame greatly reduces plastic inlet connector 44 flexing once the plastic inlet connector 44 contacts the contoured metal frame. As a result, the contoured metal frame 100, reinforces the plastic inlet connector 44 to increase the amount of lateral force the plastic inlet connector can withstand. The contoured metal frame 100 also protects the threaded connector 92 on the plastic inlet connector 44 and the ferrule nut 52. The contoured metal frame 100 when installed leaves a portion of the ferrule nut 52 exposed, so an installer's fingers can be used to tighten the ferrule nut 52. The contoured metal frame 100 also protects the appliance inlet water valve 40 from impact damage that can occur when an appliance is installed or moved in a manner similar to the metal frame 48.

Figure 12:
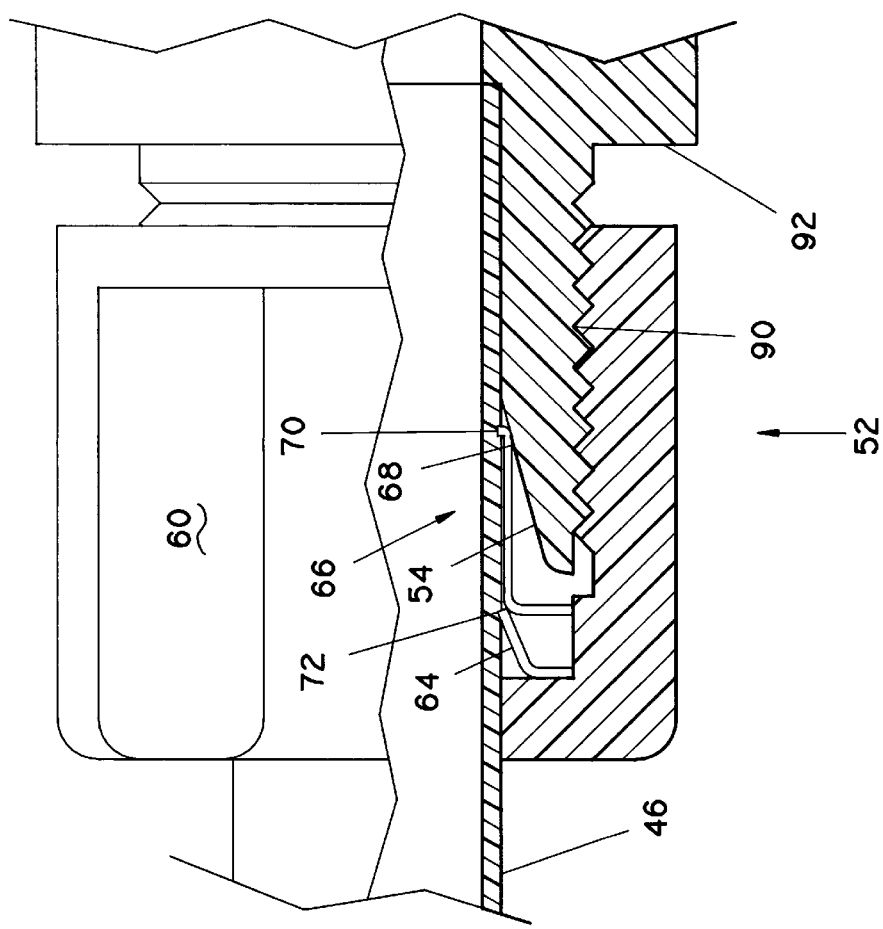
FIG. 12 shows a prior art ferrule nut with water source pipe engaging the plastic inlet connector.
Figure 13:
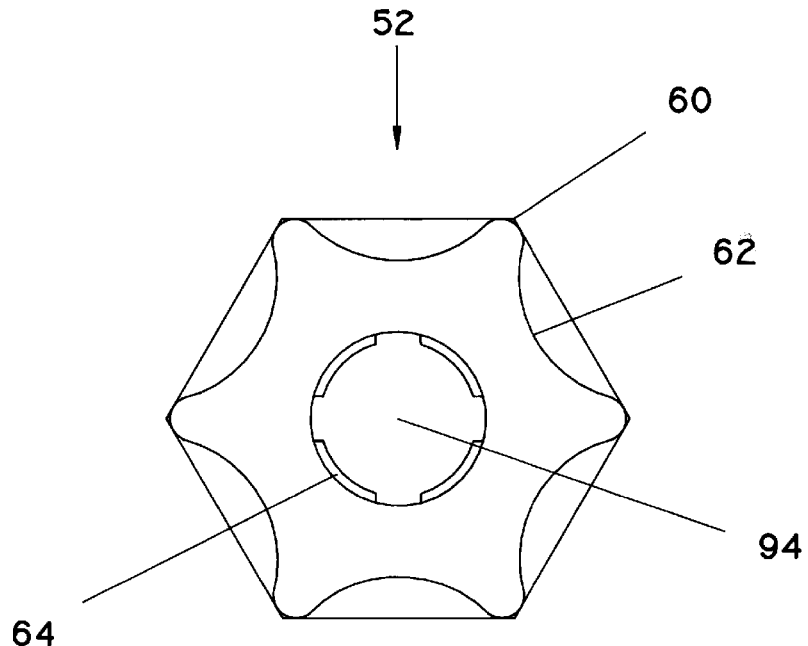
FIG. 13 shows a ferrule nut.
Figure 14:
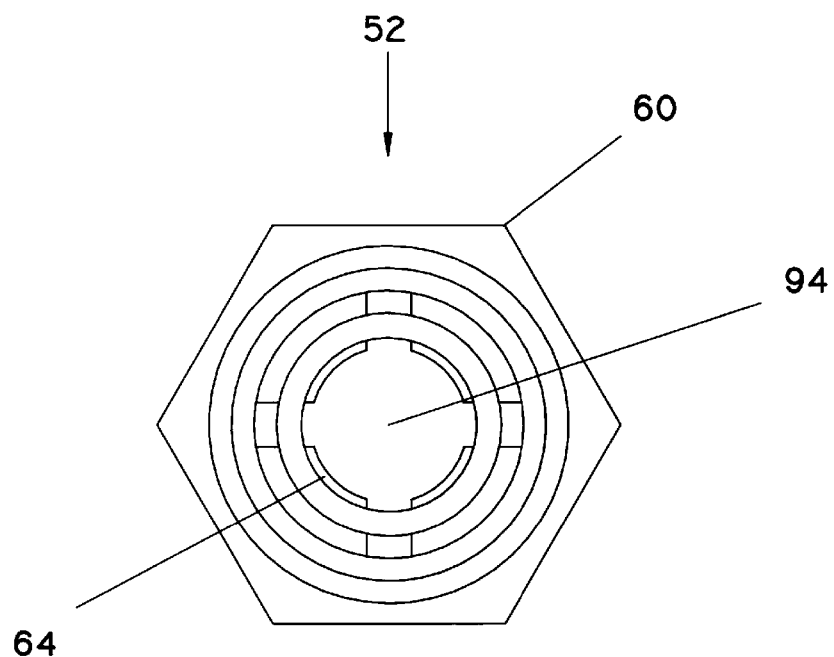
FIG. 14 shows another view of a ferrule nut.

Referring to FIGS. 12, 13 and 14, the ferrule nut 52 comprises a plastic nut 60 with indentations 62 for hand tightening; a gripper 64 for engaging the water source pipe 46 to prevent the water source pipe 46 from slipping out of the plastic inlet connector 44; and, a ferrule sleeve 66 having a body 68 that slideably engages the ferrule seat 54 and a projection 70 that is pressed by the body 68 and ferrule seat 54 against the water source pipe 46 to form a water-tight seal. Ferrule nuts 52 have been used for many years on a variety of applications. The ferrule gripper nut 52 is made of a plastic and designed to accept a 0.25 inch (0.635 cm) diameter pipe. If a larger or smaller water source pipe 46 will be used, a larger or smaller ferrule nut 52 will also be required. The plastic nut has indentations 62 for hand tightening without tools. The indentations 62 in the ferrule nut 52 can take a wide variety of forms including a standard hex head nut. Since generally the torque required to install a plastic ferrule nut 52 can be provided by a bare hand, the indentation 62 need only be fashioned to provide some friction between the ferrule nut 52 and a bare hand, so the ferrule nut 52 can be installed even when wet and slick. The use of a ferrule nut 52 permits the water source pipe 46 to be installed typically without tools which is an advantage because water source lines 46 are often connected to inlet water valve 40 in a cramped, poorly lit space where tools can be difficult to use.

Referring to FIG. 12, the ferrule nut sleeve 66 has a body 68 that slideably engages the ferrule seat 54 and a sealing projection 70 that is pressed by the body 68 and ferrule seat 54 against the water source pipe 46 to form a water-tight seal. The ferrule seat 54 is ramped, So as the ferrule nut 52 is tightened with the ferrule sleeve 66 slideably engages the ferrule seat 54 the ferrule sleeve 66 slides farther up the ramped ferrule seat 54. As the ferrule sleeve 66 moves farther up the ramp 54, the ferrule seal body 68 presses the sealing projection 70 tighter against the water source pipe 46 to create a water-tight seal.

The ferrule nut gripper 64 engages the water source pipe 46 to prevent the water source pipe 46 from slipping out of the plastic inlet connector 44. The gripper 64 can be made of a variety of materials such as plastic for use on plastic tubing or stainless steel for use on a hard, smooth water source pipe 46 such as one made of copper. The gripper 64 cooperates with the ferrule seal body 68 to engage the water source pipe 46 with a sharp edge 72. The gripper 64 is angled so if the water source pipe 46 is pulled away from the plastic inlet connector 44 then the gripper 64 will engage the water source pipe 46 with greater pressure to create more resistance for preventing the water source pipe 46 from being pulled away from the plastic inlet connector 44. Ferrule nuts 52 such as that described above are available from JACO Manufacturing Company, 468 Geiger Street, Berea, Ohio 44017.

Referring to FIGS. 5–11, the plastic inlet connector 44 is attached to the valve body inlet 74 for receiving the water inlet pipe 46 (FIG. 12) and comprises a ferrule seat 54 that is integral to the plastic inlet connector 44, an internal shoulder 76 that is also integral to the plastic inlet connector 44, an alignment collar 78, and a gusset 80. The plastic inlet connector 44 is a one-piece molded part made preferably of an FDA grade polypropylene and includes a gasket 82 typically made of rubber to create a water-tight seal when the inlet connector 44 is attached to the inlet 74. The inlet connector orifice 50 communicates with the inlet 74 and can be manufactured in a variety of angles to the inlet 74 to permit the water source pipe 46 to connect more directly with less bends to the plastic inlet connector 44. The ferrule seat 54 is designed to provide the proper ramped surface for the ferrule sleeve 66 to engage when the ferrule nut 52 is tightened. The gusset 80 is used for strengthening the plastic inlet connector and provides alignment for a mounting bracket.

The plastic inlet connector 44 can be attached to the inlet 74 in a variety of methods. The plastic inlet connector 44 can be attached to the inlet 74 with self-tapping screws 84 with a gasket 82 placed between the inlet connector 44 and the inlet 74 to create a seal. Self-tapping screw relief cavities 86 are provided in the plastic inlet connector 44 so when the plastic inlet connector 44 is attached to the inlet 74 self-tapping displacement (not shown) from the inlet 74 can expand into the relief cavity 86. The purpose for a relief cavity 86 is to ensure that the plastic inlet connector 44 seats firmly against the inlet 74 to prevent leakage.

Figure 15:
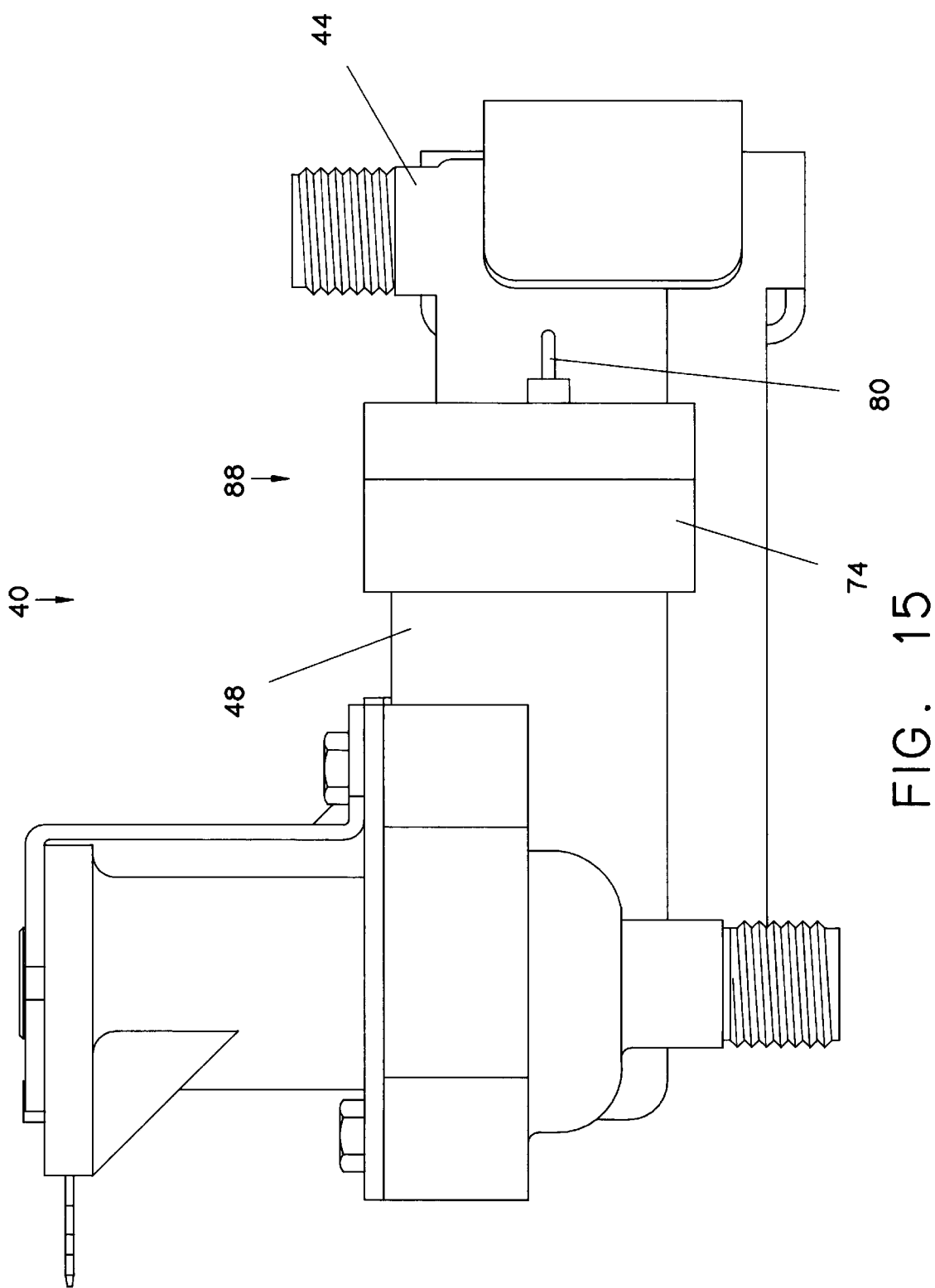
FIG. 15 shows an inlet water valve with a plastic inlet connector attached to a valve body inlet with a weldment.
Figure 16:
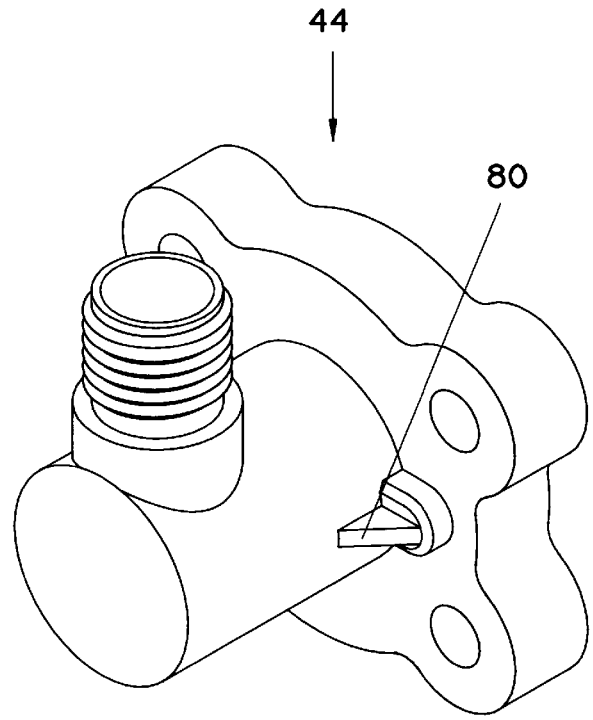
FIG. 16 shows an isometric view of the plastic inlet connector.
Figure 17:
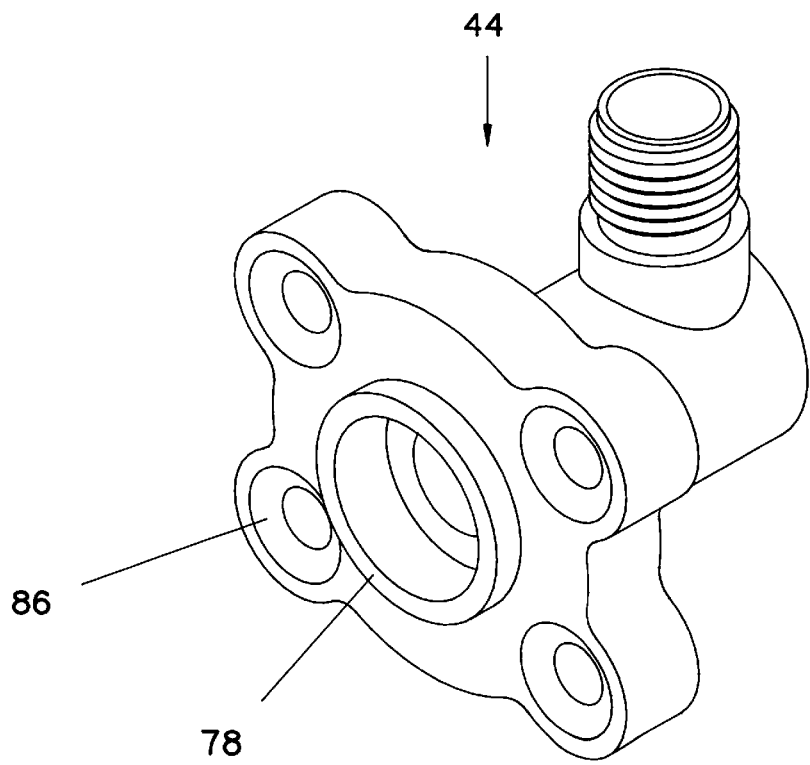
FIG. 17 shows another isometric view of the plastic inlet connector.

Referring to FIG. 15, the plastic inlet connector 44 can also be attached to the inlet 74 with a weldment 88 that uses no screws or gasket. The weldment 88 is formed by rotating or vibrating either or both the inlet connector 44 and the valve body 48 to melt the mating surfaces on the inlet connector 44 and inlet 74 to form a seal.

Operation of the invention follows. Referring to FIG. 18, the ferrule nut threads 90 are engaged with the threaded connector 92 surrounding the inlet connector cavity 50. It is an advantage of the invention that the water source pipe 46 can be connected directly to the plastic inlet connector 44 without the use of a union connector (not shown), The ferrule nut 52 is installed by attaching the ferrule nut 52 to the threaded connector 92 without having the ferrule seat 54 apply significant pressure to the ferrule sleeve 66. The water source pipe 46 is inserted through the ferrule nut bore 94 and into the inlet connector cavity 50 until the water source pipe 46 rests on the shoulder 76 on the downstream end of the inlet connector cavity 50. Since the plastic inlet connector 44 can be configured at a 30–90 degree angle relative to the inlet 74, the water source pipe 46 can be attached to the plastic inlet connector 44 without making a sharp bend. Sharp bends in the water source pipe 46 can create cavitation and thus noise. The ferrule nut 52 is tightened causing the ferrule sleeve 66 to engage the ferrule seat 54 of the plastic inlet connector 44. A seal is formed between the inlet connector cavity 50 and the water source pipe 46 by the ferrule sleeve 66 engaging the ferrule seat 54 causing the projection 70 to press against the water source pipe 46. Finally the water source pipe 46 is gripped with the ferrule nut gripper 64 that is angled to wedge the water source pipe 46 in the inlet cavity 50. The operational steps described above could be done in a different order. For instance the water source pipe 46 could be inserted through the ferrule nut bore 94 prior to engaging the ferrule nut threads 90 on the inlet connector 44. Also the ferrule nut 52 operates so that as the ferrule nut 52 is being tightened the sealing and gripping functions can occur simultaneously.

The previously described versions of the present invention have many advantages, including: Meeting anticipated requirements to eliminate parts containing lead that contact potable water by providing an all plastic inlet 24 that eliminates the need for brass fittings which can contain lead. Decreasing the manufacturing costs and increase quality by reducing the number of manufactured parts required to produce an appliance inlet water valve 40. Creating an easier to install appliance inlet water valve 40 that does not require tools to attach the water source pipe 46 to the inlet connector 44. Eliminating leaks caused by garden hose connector broken solder joints on appliance inlet water valves 30P by eliminating garden hose connectors. Decreasing water source pipe 46 kinks and obstructions by having the inlet connector 44 make a 30–90 degree bend rather than the water source pipe 46. Decreasing water inlet noise caused by cavitation. Eliminating leakage that can occur around a brass insert or brass insert gasket in the inlet connector 44 by eliminating the need for a brass insert.

Although the present invention has been described in considerable detail with reference to certain preferred versions thereof, other versions are possible. For example the plastic inlet connector 44 could be configured to accept a water source pipe 26 from any direction. A ferrule nut 52 could be attached to the plastic inlet connector 24 with captive threads, so when connecting the water source pipe 46 up to the plastic inlet connector 44 the ferrule nut 52 could not be dropped or fall off the inlet connector 44.

What is claimed is:

1. An appliance water valve, comprising:
   (a) a water source pipe supplying water to an appliance;
   (b) a valve body having a plastic inlet integral to the valve body controlling the input of water from the water source pipe to the appliance;
   (c) a ferrule nut for attaching the water source pipe to the water valve; and,
   (d) a plastic inlet connector attached to the inlet for receiving the water source pipe wherein the plastic inlet connector comprises:
      (1) an interal connector cavity with an integral internal ferrule seat that receives the water source pipe,
      (2) a ferrule nut having a plastic ferrule seal that is placed over the water source pipe, the ferrule nut engages the integral internal ferrule seat and is screwed onto external threads around the periphery of the plastic inlet connector to secure the water source pipe in the internal connector cavity with a water-tight seal.

2. The appliance water valve as recited in claim 1 wherein the plastic inlet connector, further comprises: an internal shoulder that is integral to the plastic inlet connector for properly positioning the water source pipe.

3. The appliance water valve as recited in claim 1, further comprising a metal frame for attaching the valve body to the appliance wherein the frame is shaped around the plastic inlet connector to protect the plastic inlet connector from damage.

4. The appliance water valve as recited in claim 1 wherein the appliance is a refrigerator ice maker.

5. The appliance water valve as recited in claim 1 wherein the plastic inlet connector is at about 30–90 degrees relative to the inlet.

6. The appliance water valve as recited in claim 1 wherein the plastic inlet connector is a single integral piece.

7. The appliance water valve as recited in claim 1 wherein the plastic inlet connector, further comprises a gusset for strengthening the plastic inlet connector and providing alignment for a mounting bracket.

8. The appliance water valve as recited in claim 1 wherein the water inlet pipe is plastic.

9. The appliance water valve as recited in claim 1 wherein the plastic inlet connector, further comprises an alignment collar for aligning the plastic inlet connector with the inlet during assembly.

10. The appliance water valve as recited in claim 1 wherein the plastic inlet connector is attached to the inlet with screws.

11. The appliance water valve as recited in claim 10 wherein the screws are self-tapping and the plastic inlet has a thread relief cavity.

12. The appliance water valve as recited in claim 1 wherein the plastic inlet connector is attached to the inlet with a weldment.

13. The appliance water valve as recited in claim 1 wherein the ferrule nut, comprises:
    (a) a plastic nut with indentations for hand tightening;
    (b) a gripper for engaging the water source pipe to prevent the water source pipe from slipping out of the plastic inlet connector; and,
    (c) a ferrule seal having a body that slideable engages the ferrule seat and a projection that is pressed by the body and ferrule seat against the water source pipe to form a watertight seal.

14. The appliance water valve as recited in claim 13 wherein the gripper is stainless steel.

15. The appliance water valve as recited in claim 1 wherein the water source pipe is retained in the plastic inlet connector with a gripper.

16. The appliance water valve as recited in claim 3 wherein the metal frame protects the plastic inlet connector from damage by providing support to the plastic inlet connector when a lateral force is applied to a water source pipe attached to the plastic inlet connector.

17. A method of attaching a water inlet pipe to an appliance water valve, comprising the steps of:
    (a) providing a water source pipe to the appliance water valve;
    (b) providing a plastic inlet connector attached to a water valve body having a water source orifice for receiving the water source pipe, a threaded connector surrounding the water source orifice and a ferrule seat around the upstream periphery of the water source orifice;
    (c) providing a ferrule nut having a ferrule seal, a gripper, and threads that cooperate with the threaded receptacle for attaching the ferrule nut to the plastic inlet connector and a nut bore sized to accept the water source pipe;
    (e) engaging the ferrule nut threads with the threaded connector surrounding the water source orifice;
    (f) inserting the water source pipe through the ferrule nut bore and into the water source orifice until the water source pipe rests on a shoulder on the downstream end of the water source orifice;
    (g) tightening the ferrule nut causing the ferrule seal to engage the ferrule seat of the plastic inlet connector;
    (h) sealing between the inlet orifice and the water source pipe by the ferrule seal engaging the ferrule seat and pressing against the water source pipe; and,
    (i) gripping the water source pipe by the ferrule nut gripper that is angled to wedge the water source pipe in the inlet orifice.

18. The method as recited in claim 17 wherein the plastic inlet connector, the water source orifice, the threaded connector surrounding the water source orifice, and ferrule seat around the upstream periphery of the water source orifice are a single molded plastic piece.

19. The method as recited in claim 17 wherein the ferrule nut is tightened by hand.

20. The method as recited in claim 17 wherein the ferrule seal is plastic.

* * * * *